Jan. 1, 1952     C. I. LATTIG     2,580,561
HYDRAULIC PULSATOR TRANSMISSION SYSTEM FOR CONVERTING
ROTARY MOTION INTO RECIPROCATORY MOTION
Filed Sept. 10, 1945     5 Sheets-Sheet 1

Charles Irwin Lattig, Inventor, Deceased
Byron E. Ford, Administrator
BY
ATTORNEY Jan. 1, 1952　　　　　　　　C. I. LATTIG　　　　　　2,580,561
HYDRAULIC PULSATOR TRANSMISSION SYSTEM FOR CONVERTING
ROTARY MOTION INTO RECIPROCATORY MOTION
Filed Sept. 10, 1945　　　　　　　　　　　　　　5 Sheets-Sheet 4

Charles Irwin Lattig, Inventor, Deceased
Byron E. Ford, Administrator
BY

ATTORNEY

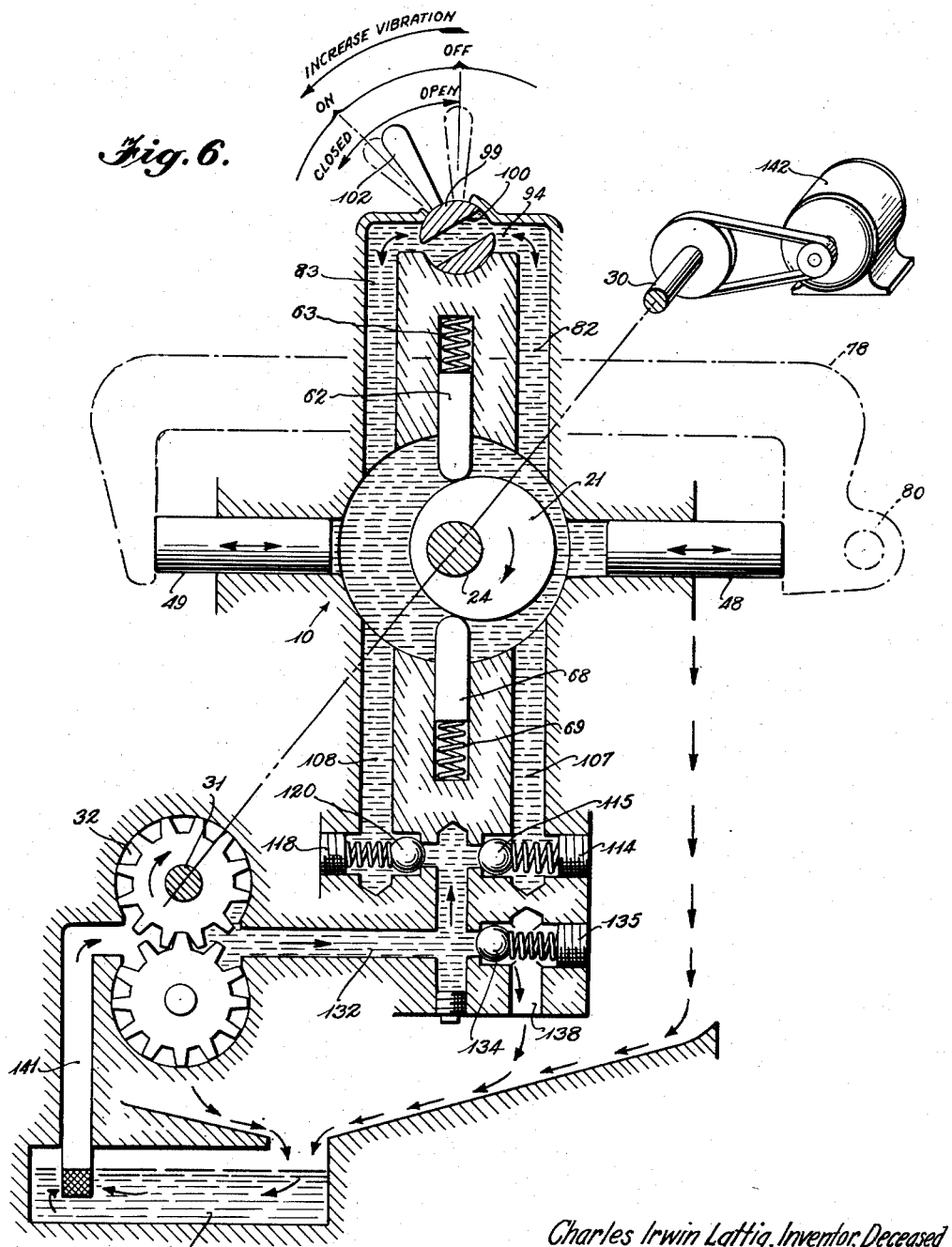

Patented Jan. 1, 1952

2,580,561

UNITED STATES PATENT OFFICE 2,580,561

HYDRAULIC PULSATOR TRANSMISSION SYSTEM FOR CONVERTING ROTARY MOTION INTO RECIPROCATORY MOTION

Charles Irwin Lattig, deceased, late of Columbus, Ohio, by Byron E. Ford, administrator, Columbus, Ohio, assignor to Link-Belt Company, a corporation of Illinois Application September 10, 1945, Serial No. 615,350

6 Claims. (Cl. 60—54.5)

This invention relates to a device for converting rotary motion into reciprocatory or vibratory motion, and more particularly, to a device of this character which permits adjustment of the amplitude of the reciprocatory motion.

There are numerous situations in which it is desired to have a device which will cause vibratory motion. For example, shaker screens require some mechanism for vibrating them to cause the material to feed over the screen. Feeder conveyors, hoppers and chutes sometimes need a vibrator to maintain a flow of the material. Concrete forms also may require shaking to compact the concrete.

It has been difficult with ordinary mechanical means producing a reciprocatory motion to obtain a variation in the amplitude of the vibration. Such a variation is important because different materials and conditions of operation may require a definite amplitude of movement to obtain optimum results. The present invention provides a device which employs hydraulic means for converting rotary motion into reciprocatory motion. As a feature of the invention, the amplitude of the vibratory motion may be infinitely varied from zero to the maximum permitted by the design of the device.

Another feature of the invention involves the provision of means to make certain that the liquid in the hydraulic system is constantly maintained under pressure and replenished as leakage occurs, to assure dependable operation.

Other features of the invention will appear from the following description when considered with the accompanying drawings.

In the drawings:

Figure 5 is a section on the line 5—5 of Figure 2, and

Figure 6 is a diagrammatic representation of the apparatus showing the mechanism and fluid system laid out in one plane.

Figure 1:
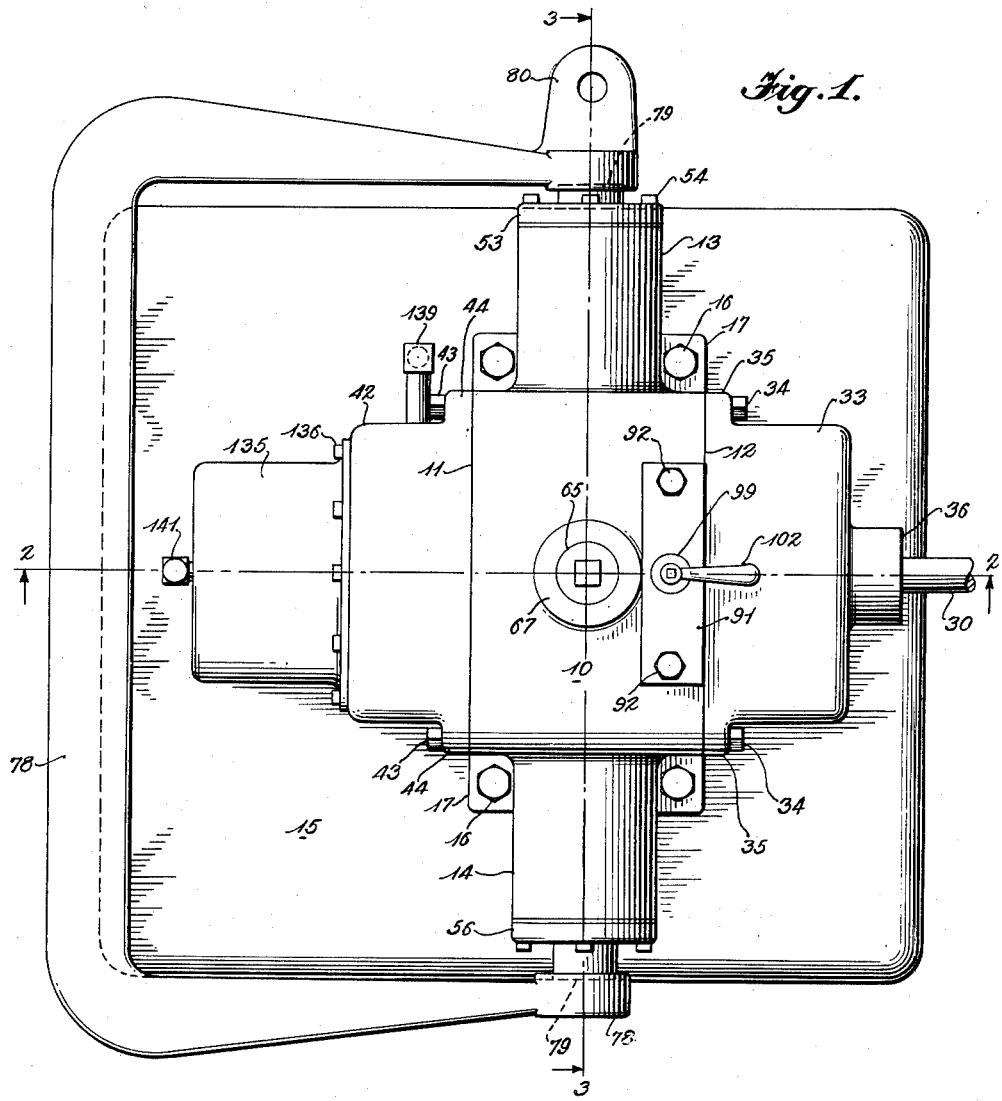
Figure 1 is a plan view of one embodiment of the invention.

The device includes a main body member 10 which is of generally rectangular shape having parallel side walls 11 and 12. Projecting from the opposite end walls of body 10 are bosses 13 and 14 which are substantially at the mid-height of the body. The body 10 is carried upon a supply tank 15 which serves as a base for the device and to which the body 10 is secured by bolts 16 passing through flanges 17 of the body.

Transversely through the body 10 is a bore 18 which opens at the opposite faces 11 and 12 of the body. This bore 18 is of the same diameter throughout the thickness of the body 10. Fitting within this bore 18 is a rotary displacement cam member 19. The central part of the member 19 is formed with a peripheral groove so that an eccentrically positioned cylindrical portion 21 is formed midway of the width of cam member 19.

Although the periphery of portion 21 is here shown to be circular, this is not essential as this peripheral surface may be of any shape so that portion 21 serves as a cam.

Figure 2:
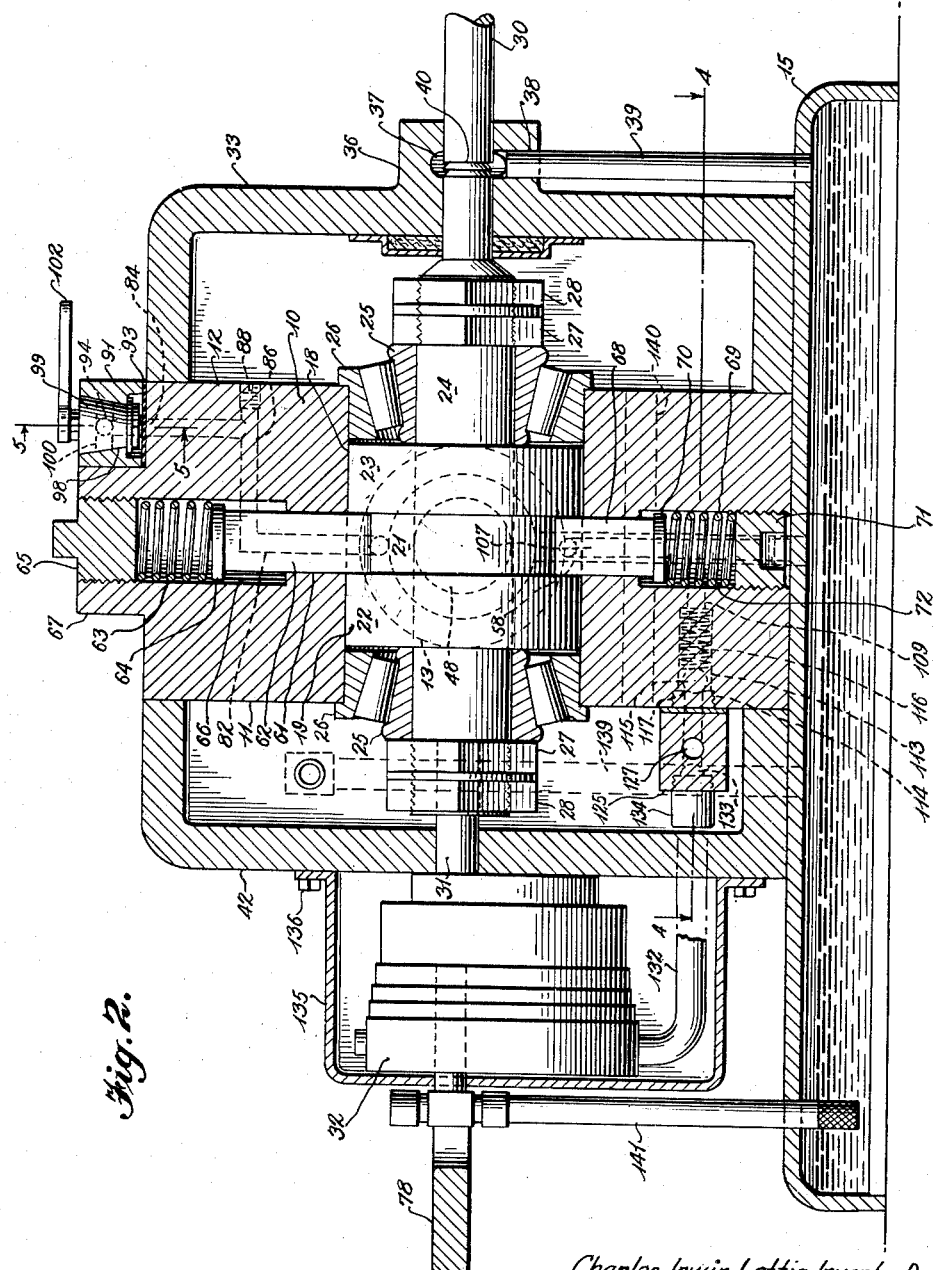
Figure 2 is a section on the line 2—2 of Figure 1.

On opposite sides of the central portion 21, the member 19 has cylindrical surfaces 22 and 23 which are of substantially the same size as the bore 18 so that a close fit is present between the periphery of these portions and the wall of the bore 18. This close fit is important to prevent leakage of fluid between these relatively moving surfaces. As is shown in Figure 2, the member 19 is of less width than the thickness of the body 10.

Passing axially through the displacement cam member 19 is a shaft 24 to which the member 19 is affixed in any suitable manner, as by keying it thereto. On opposite sides of the member 19 and upon the shaft 24 are anti-friction bearings which include an inner raceway 25 and an outer raceway 26. The rollers in these bearings are preferably of tapered formation so that they will sustain end thrust.

The inner raceways 25 are clamped firmly against the opposite sides of the cam member 19 by means of lock nuts 27 and 28 which are threaded upon end portions of the shaft 24. The outer raceways 26 do not contact the cam member 19 at their inner ends, but flanges at the outer ends of raceways 26 just bear upon the outside faces 11 and 12 of the body 10 so as not to bind the tapered rollers. This arrangement involving the shaft 24 and the disposition of the cam member 19 and bearings thereon provides a rotatable mounting for the cam member 19 while preventing its endwise movement within the body 10. By adjusting the nuts 27 and 28 on the opposite ends of the shaft 24, the endwise position of the cam member 19 along the bore 18 may be varied.

At one end the shaft 24 is reduced in size, as shown at 30, for attachment to a source of power for rotating the shaft. The other end of the shaft 24 is reduced in size, as shown at 31, and extends into a pump 32 which will later be described.

Enclosing the bearing and nuts 27 and 28 at the end of the shaft having the extension 30 is a cap 33 having a central opening through which the shaft 30 passes. The cap 33 is secured to the side of the body 10 by means of bolts 34 which pass through a flange 35 of the cap 33. Integral with the cap 33 and surrounding the shaft 30 is a boss 36 having an internal groove 37 from which an opening 38 leads to the periphery of the boss 36. A pipe 39 extends from the opening 38 to the supply tank 15 to conduct any oil which may feed along the shaft 30, and into groove 37, down into the supply tank 15. To serve to remove from the shaft 30 any such oil which may move therealong and to cause it to be deposited in the groove 37, this shaft may be formed with annular grooves 40.

The shaft extension 31 passes through a cover 42 which encloses the roller bearing and lock nuts 27 and 28 at the end of the shaft from which the extension 31 projects. The cover 42 is attached to the body 10 by means of bolts 43 which pass through a flange 44 of the cover 42.

Extending into the body 10 and axially through the boss 13 is a bore 46, and extending into the body 10 and axially through the boss 14 is a bore 47. These bores 46 and 47 are axially in line with each other and are of the same diameter. As here shown their axes intersect the cam member 19, but this is not an essential relationship. Fitting within the bore 46 is a piston 48 which extends from a position outside the boss 13 to an inner position slightly short of the periphery of the cylindrical surfaces 22 and 23 of the cam member 19. A similar piston 49 is located within the bore 47 and extends to a position outside of the boss 14. These pistons are free to move in an endwise direction under hydraulic pressure exerted upon their inner faces or under a mechanical push exerted upon their exterior faces.

The boss 13 is axially recessed at 51 to provide a chamber for receiving oil which may seep along the space between the piston 48 and the bore 46. To assist the removal of this oil from the piston 48 at a point within the recess 51, the piston may be formed with annular grooves 52 at the point where it passes in and out of the body of boss 13. The end of recess 51 is closed by a plate 53 held onto the boss 13 by bolts 54.

The boss 14 is formed with a recess 55, similar to the recess 51, which is closed by a plate 56 similar to plate 53. Grooves 57 in the periphery of the piston 49 serve to assist removal of oil from the piston 49 and deposit it within recess 55.

Leading from recess 51 to the supply tank 15 is a pipe 58 which returns oil from within the recess 51 to the supply tank. A similar pipe 59 returns to the tank 15 any oil which seeps into chamber 55 from around the piston 49.

Extending through a slot 61 in the body 10 is a cam follower 62, here shown in the form of a vane, which is of the same width as the peripheral groove in the displacement cam member 19, so that it fits snugly against the side walls of this groove. The slot 61 is of substantially the same cross-sectional size as the vane 62 so that there will be a minimum leakage along the vane 62. To urge the vane 62 into contact with the periphery of the cam portion 21, a spring 63 is provided. Spring 63 bears upon an end disc 64 affixed to the vane 62 and also upon a plug 65. The end disc 64, spring 63 and plug 65 are all located within a bore 66 extending into the body 10 from the upper surface thereof. This bore 66 opens outwardly of the body 10 through a boss 67 in which plug 65 is screwed.

A vane 68, similar to vane 62, bears upon the periphery of the eccentric cam portion 21 at a point opposite from the vane 62. This vane 68 is urged inwardly by a spring 69 which bears at one end against the end disc 70 of vane 68 and bears at its other end against a plug 71. The spring 69, end disc 70 and plug 71 are located within a bore 72 in the body 10.

Figure 3:
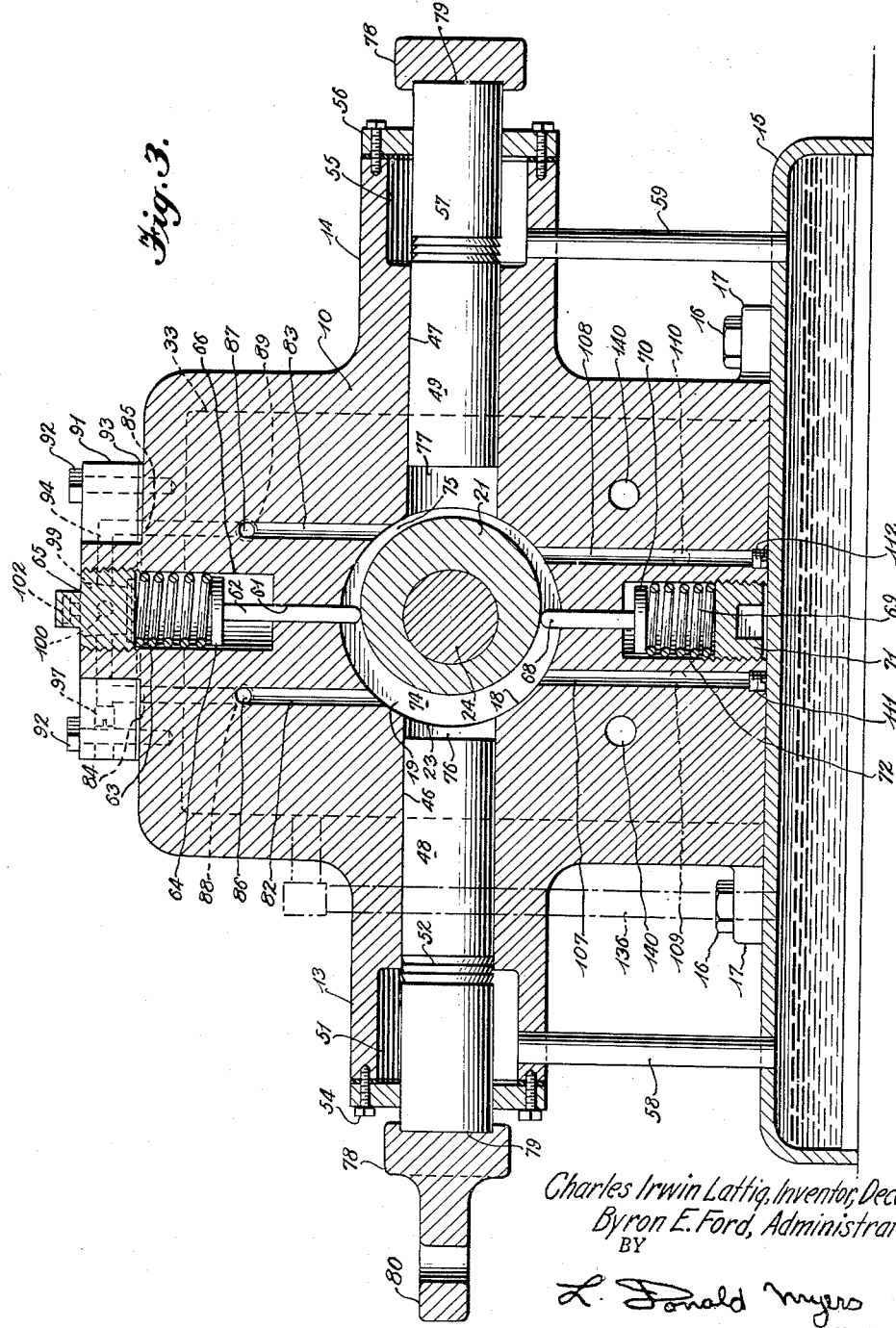
Figure 3 is a section on the line 3—3 of Figure 1.

It will be observed from Figure 3 that the vanes 62 and 68 are on diametrically opposite sides of the axis of rotation of the cam portion 21. These vanes, therefore, divide the cam chamber which is outside of the cam portion 21 into two chamber sections 74 and 75. The chamber section 74 communicates with the compartment 76 at the end of bore 46 to which the inner end face of piston 48 is exposed. Chamber section 75 is in communication with the compartment 77 at the end of bore 47 and to which the inner end face of piston 49 is exposed. Therefore, an increase in pressure in chamber section 74, due to rotation of the high part of cam 21 into chamber section 74, will cause the fluid in compartment 76 to exert pressure upon the inner end face of piston 48. In like manner, continued rotation of the high part of cam 21 from the chamber section 74 to bring it into the chamber section 75 will force fluid from the chamber section 75 into compartment 77 and exert pressure upon the inner end of piston 49.

To interconnect the pistons 48 and 49 so that they will move in unison, a yoke 78 is provided. This yoke 78 passes entirely around the body structure as is shown in Figure 1. At the meeting faces between the pistons 48 and 49 and the ends of yoke 78, the yoke has recesses 79 to receive the ends of pistons 48 and 49 and retain the ends of the yoke upon the pistons. Forming a part of the yoke 78 is a lug 80 having an opening therethrough to provide a means for attachment of the reciprocatory yoke to the mechanism to be vibrated.

It will be apparent that movement of the piston 49 to the right, as it appears in Figure 3, under the influence of the pressure developed in chamber section 75 and compartment 77 by rotation of the cam portion 21, will push upon the yoke 78 to urge it toward the right. This movement of yoke 78 will carry with it piston 48 to move it to the right, as it appears in Figure 3. Such movement of piston 48 toward the cam portion 21 will force the liquid in compartment 76 into the chamber section 74, and this liquid will be accommodated by the space in chamber section 74 vacated by movement of the high part of cam 21 from chamber section 74 into chamber section 75. When the high portion of cam 21 thereafter moves into chamber section 74 from chamber section 75 and causes piston 48 to move to the left, it will urge yoke 78 to the left and thereby cause piston 49 to also move to the left. An action similar to that which has been described will occur since the liquid forced out of compartment 77, due to the leftwise movement of piston 49, will be accommodated in chamber section 75 by the removal of the high portion of cam 21 from chamber section 75.

Therefore, the pistons 48 and 49 will move in unison back and forth, even though there is no direct flow of liquid between chamber sections 74 and 75. The yoke 78 and pistons 48 and 49 constitute a double acting piston arrangement operated by reversely flowing fluid impulses. The device may be operated in this manner to obtain a maximum amplitude of movement of the yoke 78, but the invention contemplates the provision of means by which the amplitude can be varied from this maximum down to zero.

This reduction in the amplitude of movement of yoke 78 is accomplished by allowing some of the liquid to flow between chamber sections 74 and 75. By by-passing some of this liquid between chamber sections 74 and 75, all of the liquid which is displaced by the cam 21 will not act upon the piston 48 or 49, and consequently each piston will have only a fraction of its maximum movement.

The by-pass between chamber sections 74 and 75 includes passages 82 and 83 which extend from chamber sections 74 and 75, respectively, up to ports 84 and 85 at the top face of body 10. Ports 84 and 85 are displaced toward one side of the boss 67 at the top of body 10, and this is accomplished by providing offset portions 86 and 87 (Figure 2). These offset portions of passageways 82 and 83 are formed by bores entering through the side faces 12 of the body 10, the openings to these bores being thereafter closed by plugs 88 and 89.

Secured to the top face of the body 10 is a valve body 91. This valve body 91 is held in place by bolts 92 which clamp a gasket 93 between the main body 10 and the valve body 91. The valve body 91 has a passageway 94 (Figure 5) lengthwise therethrough from which extend lateral openings to ports 95 and 96 which register, respectively, with ports 84 and 85. A plug 97 closes the end opening of the longitudinal bore 94.

A conical bore 98 is formed into the valve body 91 in axial alignment with the passageway 94 so that the passageway 94 opens on diametrically opposite sides of the bore 98. A rotary plug valve 99 is positioned within the conical bore 98 and has a bore 100 therethrough to establish communication along the longitudinal passageway 94 as the plug 99 is rotated.

To rotate plug 99 a handle 102 is attached thereto. To retain the plug 99 in the conical bore 98 and draw it into fluid tight engagement with the wall of bore 98, a washer 103 is passed over a stem extension 104 of the plug 99 and nut 105 is screwed upon the stem 104. Nut 105 and washer 103 are located in a bore 106 on the under side of valve body 91.

The invention also contemplates the provision of means to make certain that the chamber sections 74 and 75, the compartments 76 and 77 and the passageways 82 and 83 leading to the valve 99 are maintained filled with liquid under constant pressure. This is accomplished by constantly supplying liquid under pressure by means of the rotary pump 32.

Extending downwardly from the chamber sections 74 and 75 are passageways 107 and 108, respectively. These passages 107 and 108 communicate with lateral passages 109 and 110, respectively, which open at the side face 11 of the cam body 10. These passages 107, 108, 109 and 110 are formed by boring inwardly from the side faces of the body and thereafter closing the ends of passageways 107 and 108 by plugs 111 and 112, respectively.

Referring to the passageway 109, this has an enlarged bore 113 opening at the face 11. A plug 114 having an orifice therethrough is threaded into the opening to bore 113. A ball 115 and spring 116 are located inside of the bore 113 and are retained therein by the plug 114. The ball 115 seats against the orifice through plug 114 by pressure against the valve seat 117 thereof. The ball 115, therefore, serves as a check valve to permit liquid to flow into but not out of passages 109 and 107, and section 74 of the cam chamber.

The opening of passageway 110 at face 11 of the body 10 is controlled in a similar manner by a plug 118 having a seat 119 at an orifice through the plug 118. A ball 120 is urged against this seat 119 by a spring 121. These latter parts are positioned within a bore 122 corresponding to bore 113. The ball 120, therefore, serves as a check valve to permit liquid to flow into but not out of passages 110 and 108, and section 75 of the cam chamber.

Figure 4:
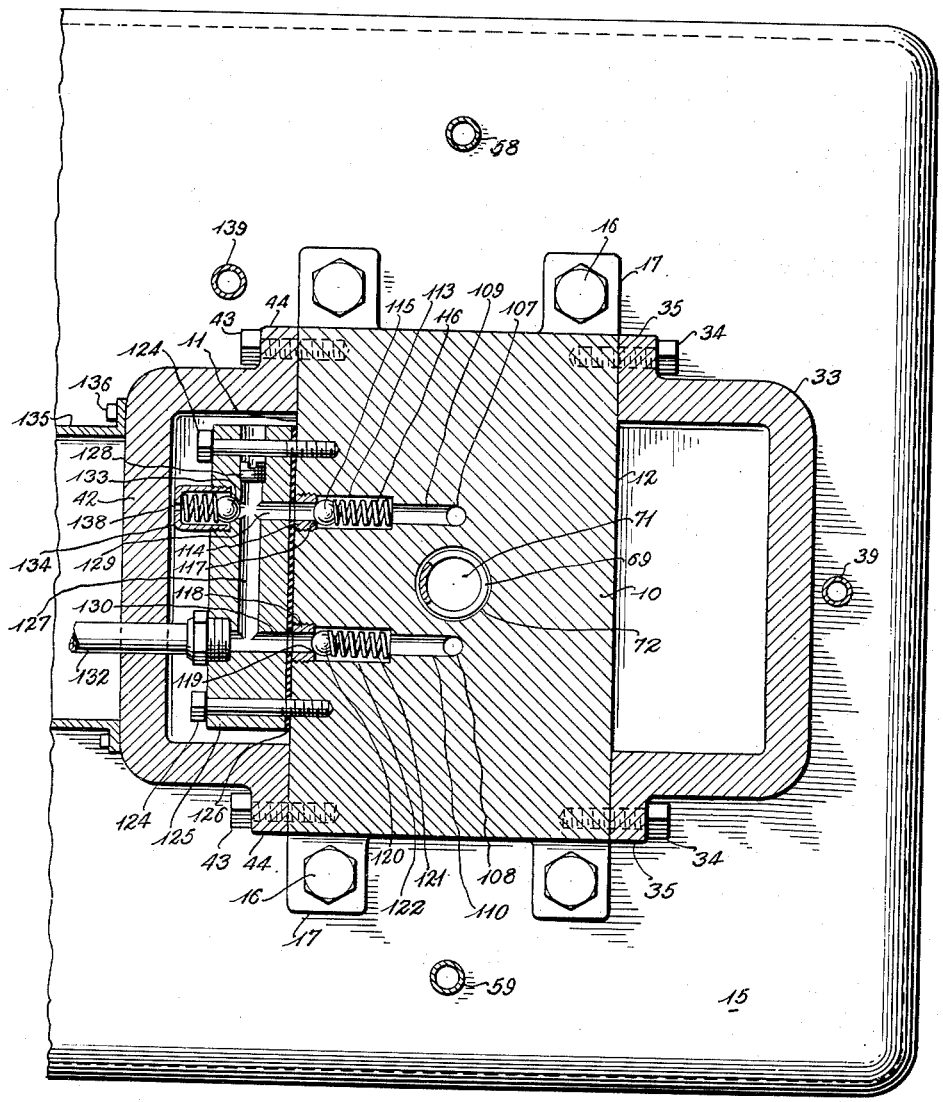
Figure 4 is a section on the line 4—4 of Figure 2.

Clamped against the face 11 by bolts 124 is a liquid distributing block 125 (Figure 4), there being a gasket 126 interposed between these meeting faces. Through the distributing block 125 is a longitudinal passage 127, the end of which is closed by plug 128. A transverse bore 129 is drilled through the block 125 to register with the orifice through plug 114 and a similar transverse bore 130 is drilled through block 125 to register with the orifice through plug 118.

A pipe 132 extends from the pump 32 to the other side of transverse bore 130 to supply liquid to the longitudinal passageway 127. As the pump 32 is rotating constantly, it supplies liquid under pressure to valves 115 and 120, and past these valves when necessary to take care of any leakage from the system. Excess liquid is permitted to escape through a relief valve 133 contained within a shell 134, screwed into the block 125 in the other branch of transverse passageway 129. A cover 135, held onto cap 42 by screws 136, encloses pump 32.

The pump 32, therefore, maintains the fluid system constantly under pressure. This avoids the necessity for packing glands in the device and permits considerable wear to occur before replacement is necessary. Also, it permits fairly liberal clearances to be made so that manufacture of the device is more easily permitted.

An opening 138 in the shell 134 permits the liquid to escape into the chamber within the cap 42. This liquid which escapes into the chamber within cap 42 passes outwardly therefrom through an overflow pipe 139 which conducts this excess liquid back to the supply tank 15. Liquid which may accumulate inside of cap 33 flows through passages 140 into cap 42 for return to tank 15. Pump 32 receives its liquid from a pipe 141 which dips into tank 15.

Shaft 30 may be rotated by any power source as the electric motor 142 shown in Figure 6. The speed of rotation of shaft 30 determines the vibration frequency of pistons 48 and 49 and yoke 78. To vary the amplitude of this vibration, it is merely necessary to adjust valve 99 by handle 102 and this may be done while the shaft 30 is being rotated at any speed. When valve 99 is closed the maximum amplitude is obtained and when the valve is wide open there should be no motion of pistons 48 and 49 and yoke 78. Variations in stroke between zero and the maximum are obtained by placing valve 99 in an intermediate position.

The invention claimed is:

1. A device for converting rotary motion into reciprocatory motion comprising means mounted for reciprocatory motion and presenting oppositely facing surfaces to be exposed to fluid pressure, means forming a pressure compartment enclosing each of said surfaces, a displacement cam mounted for rotary movement, a shaft carrying said displacement cam, a pair of followers on opposite sides of the displacement cam, means urging the followers into sealing contact with the periphery of the cam, a body in which said shaft is mounted, means including said body for confining the displacement cam and followers to form a chamber around the periphery of the cam, said followers separating said chamber into two sections, said chamber sections being each in communication with one of said compartments, and a liquid pump carried by said shaft and having communications with the chamber sections to maintain them and the compartments supplied with liquid under pressure.

2. A device for converting rotary motion into reciprocatory motion comprising means mounted for reciprocatory movement and presenting oppositely facing surfaces to be alternately exposed to elevated fluid pressure, a mechanical motion transmitting member to be reciprocated operatively connected to said means so as to be actuated as intended when said oppositely facing surfaces are alternately exposed to elevated fluid pressure, means forming a pressure compartment enclosing each of said surfaces, a displacement cam mounted for rotary movement, a shaft carrying said displacement cam, a pair of followers on opposite sides of the displacement cam, means urging the followers into sealing contact with the periphery of the displacement cam, a body in which said shaft is mounted, means including said body for confining the displacement cam and followers to form a chamber around the periphery of the cam, said followers separating said chamber into two sections so that rotation of the displacement cam will alternately increase and decrease the volumetric capacity of each of said chamber sections and with the changes in the capacities of the two chamber sections occurring in the reverse order, a passageway leading from one of said chamber sections to one of said compartments, another passageway leading from the other chamber section to the other compartment, a duct extending from one chamber section to the other through which fluid displaced from each chamber section by the displacement cam may flow into the other chamber section, a valve located in said duct to control the flow of fluid through the duct, and liquid pumping means directly connected to said shaft for maintaining said chamber sections and the communicating system filled with liquid under pressure.

3. A device for converting rotary motion into reciprocatory motion, comprising a housing having a fluid chamber formed therein, a rotatable shaft journaled in the housing and extending through the chamber, a displacement cam fastened to the shaft and positioned in the chamber so as to leave a fluid space around the periphery of the cam, means to divide the fluid space of the chamber into two separate sections so that the fluid will be alternately displaced from the two chamber sections by the rotation of the cam, cylinder means formed in the housing at right angles to the axis of the shaft, means formed in the housing for establishing communication between different portions of the cylinder means and the separate sections of the chamber so that the cylinder means may receive the fluid that is displaced from the chamber sections, reciprocating piston means in the cylinder means having oppositely acting faces that may be alternately exposed to the fluid displaced from the chamber sections so that the piston means may be reciprocated by the action of the displaced fluid, fluid pumping means in the housing and directly connected to said shaft, means in the housing for separately delivering fluid under pressure to the two chamber sections and the portions of the cylinder means connected thereto, and a mechanical motion transmitting member to be reciprocated operatively connected to said reciprocating piston means so as to be actuated as intended when the oppositely acting faces of said piston means are alternately exposed to displaced fluid.

4. A device for converting rotary motion into reciprocatory motion, comprising a housing having a fluid chamber formed therein, a rotatable shaft journaled in the housing and extending through the chamber, a displacement cam fastened to the shaft and positioned in the chamber so as to leave a fluid space around the periphery of the cam, means to divide the fluid space of the chamber into two separate sections so that the fluid will be alternately displaced from the two chamber sections by the rotation of the cam, cylinder means formed in the housing at right angles to the axis of the shaft, means formed in the housing for establishing communication between different portions of the cylinder means and the separate sections of the chamber so that the cylinder means may receive the fluid that is displaced from the chamber sections, reciprocating piston means in the cylinder means having oppositely acting faces that may be alternately exposed to the fluid displaced from the chamber sections so that the piston means may be reciprocated by the action of the displaced fluid, fluid pumping means in the housing and directly connected to said shaft, means in the housing for separately delivering fluid under pressure to the two chamber sections and the portions of the cylinder means connected thereto, a fluid reservoir in the base of the housing, means for supplying the pumping means with fluid from the reservoir, means for returning to the reservoir fluid delivered by the pump in excess of that required by the chamber sections and cylinder means and any fluid that leaks from the cylinder means, and a mechanical motion transmitting member to be reciprocated operatively connected to said reciprocating piston means so as to be actuated as intended when the oppositely acting faces of said piston means are alternately exposed to displaced fluid.

5. A device for converting rotary motion into reciprocatory motion, comprising a housing having a fluid chamber formed therein, a rotatable shaft journaled in the housing and extending through the chamber, a displacement cam fastened to the shaft and positioned in the chamber so as to leave a fluid space around the periphery of the cam, means to divide the fluid space of the chamber into two separate sections so that the fluid will be alternately displaced from the two chamber sections by the rotation of the cam, cylinder means formed in the housing at right angles to the axis of the shaft, means formed in the housing for establishing communication between different portions of the cylinder means and the separate sections of the chamber so that the cylinder means may receive the fluid that is displaced from the chamber sections, reciprocating piston means in the cylinder means having oppositely acting faces that may be alternately exposed to the fluid displaced from the chamber sections so that the piston means may be reciprocated by the action of the displaced fluid, means in the housing and controllable from the exterior thereof for varying the volume of displaced fluid that is received by the cylinder means from the chamber section, fluid pumping means in the housing and directly connected to said shaft, means in the housing for separately delivering fluid under pressure to the two chamber sections and the portions of the cylinder means connected thereto, and a mechanical motion transmitting member to be reciprocated operatively connected to said reciprocating piston means so as to be actuated as intended when the oppositely acting faces of said piston means are alternately exposed to displaced fluid.

6. A device for converting rotary motion into reciprocatory motion, comprising a housing having a fluid chamber formed therein, a rotatable shaft journaled in the housing and extending through the chamber, a displacement cam fastened to the shaft and positioned in the chamber so as to leave a fluid space around the periphery of the cam, means to divide the fluid space of the chamber into two separate sections so that the fluid will be alternately displaced from the two chamber sections by the rotation of the cam, cylinder means formed in the housing at right angles to the axis of the shaft, means formed in the housing for establishing communication between different portions of the cylinder means and the separate sections of the chamber so that the cylinder means may receive the fluid that is displaced from the chamber sections, reciprocating piston means in the cylinder means having oppositely acting faces that may be alternately exposed to the fluid displaced from the chamber sections so that the piston means may be reciprocated by the action of the displaced fluid, means in the housing and controllable from the exterior thereof for varying the volume of displaced fluid that is received by the cylinder means from the chamber section, fluid pumping means in the housing and directly connected to said shaft, means in the housing for separately delivering fluid under pressure to the two chamber sections and the portions of the cylinder means connected thereto, a fluid reservoir in the base of the housing, means for supplying the pumping means with fluid from the reservoir, means for returning to the reservoir fluid delivered by the pump in excess of that required by the chamber sections and cylinder means and any fluid that leaks from the cylinder means, and a mechanical motion transmitting member to be reciprocated operatively connected to said reciprocating piston means so as to be actuated as intended when the oppositely acting faces of said piston means are alternately exposed to displaced fluid.

BYRON E. FORD,
*Administrator of Charles Irwin Lattig, Deceased.*

REFERENCES CITED

The following references are of record in the file of this patent:

UNITED STATES PATENTS

| Number | Name | Date |
|---|---|---|
| 560,934 | Robertson | May 26, 1896 |
| 560,935 | Robertson | May 26, 1896 |
| 857,558 | Keenan | June 18, 1907 |
| 889,875 | Gerrich | June 2, 1908 |
| 1,591,471 | Constantinesco | July 6, 1926 |
| 1,719,502 | Dienner | July 2, 1929 |
| 1,787,120 | Noble | Dec. 20, 1930 |
| 1,927,580 | Wisner | Sept. 19, 1933 |
| 2,072,693 | Volkert | Mar. 2, 1937 |
| 2,133,569 | Price | Oct. 18, 1938 |
| 2,262,814 | Norvell | Nov. 18, 1941 |
| 2,368,628 | Bates | Feb. 6, 1945 |
| 2,479,535 | Deloghia | Aug. 16, 1949 |

FOREIGN PATENTS

| Number | Country | Date |
|---|---|---|
| 345,667 | Great Britain | Mar. 23, 1931 |
| 346,020 | Great Britain | Mar. 30, 1931 |